O. & C. WASTE.
MACHINE FOR CUTTING HAY FOR PRESSING.
No. 41,416. Patented Jan. 26, 1864.
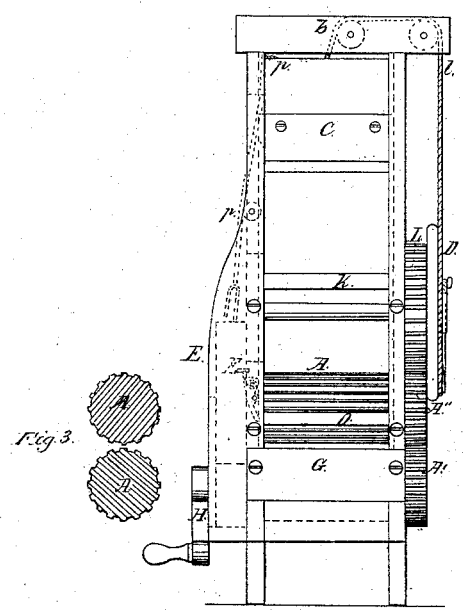
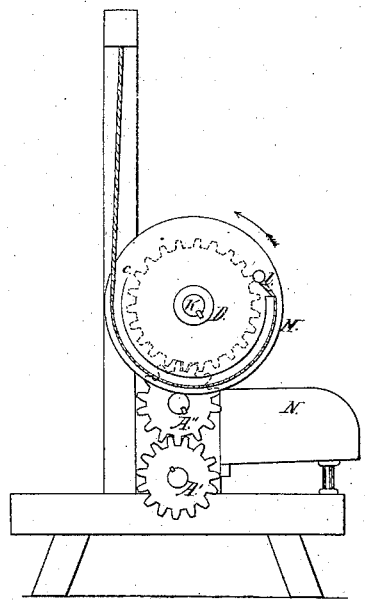
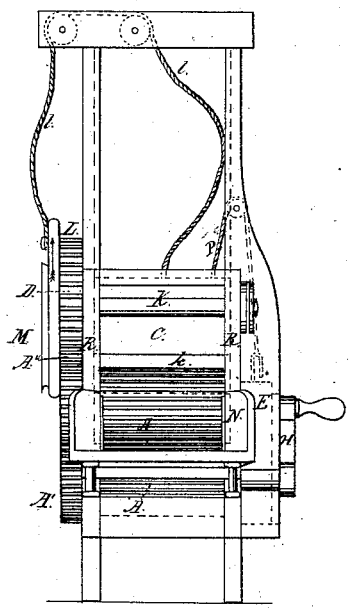

United States Patent Office.

ORSON WASTE AND CHARLES WASTE, OF CAMERON, ILLINOIS, ASSIGNORS TO CHARLES WASTE, AFORESAID.

IMPROVEMENT IN MACHINES FOR CUTTING HAY FOR PRESSING.

Specification forming part of Letters Patent No. 41,416, dated January 26, 1864.

*To all whom it may concern:*

Be it known that we, ORSON WASTE and CHARLES WASTE, of Cameron, in the county of Warren and State of Illinois, have invented certain new and useful Improvements in Machines for Cutting and Preparing Hay for Pressing; and we do hereby declare the following to be a full, clear, and exact description thereof, reference being had to the accompanying drawings, and to the letters of reference marked thereon, in which—

Figure 1 is a rear elevation. Fig. 3 is a section of rollers. Fig. 2 is a side elevation; Fig. 5, section of blade or knife. Fig. 4 is a front elevation with knife down.

The nature of our invention consists in constructing a machine for pressing and cutting hay or similar material by rolling it between two rollers preparatory to pressing it into bales, to be more fully hereinafter described, in such a manner that the rolling and cutting are done at regular intervals, and the hay or similar substance deposited in successive quantities upon the same heap or bale.

In the drawings, A A are two rollers, made of iron or any other suitable material, to which are attached two pinions, A' A", that mesh into each other. K is a shaft with a spur-wheel, L, attached at one end. This spur-wheel L meshes into the upper pinion, A". On the outer side of this spur-wheel is placed a circular disk, D, which fits closely and firmly to the said spur-wheel. On this disk, a little distance from its circumference, there is a channeled or grooved projection, M, for a cord, *l*, to operate on. This projection begins a little distance above the diameter of the circular disk D and near its outer edge or circumference, and gradually tapers to a point, *c*, in about the same position on the other side of the center of said disk as where the projection begins, as far as it goes being parallel with the circumference of the disk.

When the crank H, attached to the lower pinion and roller, A' and A, is revolved in the direction indicated by the arrow in Fig. 2, it operates or sets in motion the rollers A A, the spur-wheel L, and pinions A' A", and the circular disk or plate D, thus operating upon the cord *l*, which, catching upon the projecting edge of the channel, conforms to its concavity, drawing up a knife, C, attached to its other end. At the same time it pulls up a weight, E, until a catch, F, falls into a notch in the weight; and, finally, the cord *l* gets to the point *c* on the disk where it suddenly falls or slips off. The knife C drops down and cuts off the hay to the proper length. The knife C is prevented from cutting too deep in the bottom G by means of a shoulder, *k*, on the block to which the knife is attached falling on the strip or guard *o*. After the blade or knife C has cut the hay off in sheets it is drawn up out of the way by means of the weight E, which is attached to a cord, *p*, and fastened to the upper side of the knife C. When the knife falls it strikes upon the catch F, thus letting the weight E fall down, and thereby instantly pulling up the knife after it has cut the hay, thus allowing the material put in the hopper N to pass on unobstructed till the cord *l* again lifts the knife, when the same operation of parts is repeated.

The rollers A A are ribbed or fluted for the purpose of drawing in the hay.

B B are two strips running up in front and between the rollers, so as to prevent the hay from getting in between the rollers and the sides of the frame R R and prevent the easy working of the rollers.

A driving-shaft is coupled on the shaft where the crank or handle is shown in the drawings, and the machine either driven by horse or steam power, or any other means.

Instead of using the knife C to cut the hay off in lengths, a revolving knife cutting against a roller might be used with a similar result.

The object of rolling the hay, which is a novel feature in hay-pressing, is to break the stems and close the hollow in the interior of the straws, thus making the bale more solid and compact, so that it may be compressed into smaller bales, and thereby facilitate its transportation.

In making a practical application of the qualities of our machine we find that it compresses more hay in the same space than any other machine, while at the same time its parts are uniformly and rapidly manipulated.

Having thus fully described our invention, what we claim, and desire to secure by Letters Patent of the United States, is—

1. The combination of the rollers A A with a knife working periodically so connected and geared to the rollers as to cut the hay in proper lengths for packing, substantially as set forth.

2. The combination and arrangement of the catch F with the weight E and knife C, substantially as and for the purpose specified.

3. The combination of the knife C with a grooved projection, M, substantially as set forth.

ORSON WASTE.
CHAS. WASTE.

Witnesses:
C. U. CRANDALL,
D. C. KNIGHT.